US008990702B2

(12) United States Patent
Navarro et al.

(10) Patent No.: US 8,990,702 B2
(45) Date of Patent: Mar. 24, 2015

(54) SYSTEM AND METHOD FOR CONTROLLING A NETWORKED DISPLAY

(75) Inventors: Pedro Navarro, Santa Clara, CA (US); Ronald Jacoby, Saratoga, CA (US)

(73) Assignee: Yahoo! Inc., Sunnyvale, CA (US)

( * ) Notice: Subject to any disclaimer, the term of this patent is extended or adjusted under 35 U.S.C. 154(b) by 794 days.

(21) Appl. No.: 12/894,569

(22) Filed: Sep. 30, 2010

(65) Prior Publication Data

US 2012/0084662 A1   Apr. 5, 2012

(51) Int. Cl.
- *G06F 3/00* (2006.01)
- *H04N 21/4227* (2011.01)
- *H04N 21/41* (2011.01)
- *H04M 1/725* (2006.01)
- *H04N 5/445* (2011.01)
- *H04N 21/485* (2011.01)
- *H04N 21/81* (2011.01)
- *H04N 5/44* (2011.01)

(52) U.S. Cl.
CPC ....... *H04N 21/4227* (2013.01); *H04N 21/4126* (2013.01); *H04M 1/72533* (2013.01); *H04N 5/44543* (2013.01); *H04N 21/485* (2013.01); *H04N 21/812* (2013.01); *G08C 2201/92* (2013.01); *G08C 2201/93* (2013.01); *H04N 2005/4425* (2013.01); *H04N 2005/44565* (2013.01)
USPC ........................................................ 715/740

(58) Field of Classification Search
None
See application file for complete search history.

(56) References Cited

U.S. PATENT DOCUMENTS

| | | | |
|---|---|---|---|
| 6,263,505 B1 | 7/2001 | Walker et al. | 725/110 |
| 6,401,059 B1 * | 6/2002 | Shen et al. | 703/27 |
| 6,772,214 B1 * | 8/2004 | McClain et al. | 709/229 |
| 7,009,528 B2 * | 3/2006 | Griep | 340/12.54 |
| 7,511,632 B2 * | 3/2009 | Nam et al. | 340/12.54 |
| 7,774,499 B1 * | 8/2010 | Popek et al. | 709/242 |
| 7,870,496 B1 * | 1/2011 | Sherwani | 715/761 |
| 8,479,101 B2 * | 7/2013 | Dees | 715/740 |
| 2002/0002707 A1 * | 1/2002 | Ekel et al. | 725/87 |
| 2002/0095687 A1 * | 7/2002 | Shintani et al. | 725/112 |
| 2003/0141987 A1 * | 7/2003 | Hayes | 340/825.72 |
| 2003/0208554 A1 * | 11/2003 | Holder | 709/217 |
| 2004/0010327 A1 * | 1/2004 | Terashima et al. | 700/83 |
| 2004/0031058 A1 * | 2/2004 | Reisman | 725/112 |
| 2004/0268413 A1 | 12/2004 | Reid et al. | 725/131 |
| 2005/0028222 A1 * | 2/2005 | Megeid | 725/135 |
| 2005/0039133 A1 * | 2/2005 | Wells et al. | 715/740 |
| 2006/0004834 A1 * | 1/2006 | Pyhalammi et al. | 707/102 |
| 2006/0112181 A1 * | 5/2006 | Affaki | 709/227 |
| 2006/0288300 A1 * | 12/2006 | Chambers et al. | 715/744 |
| 2007/0105591 A1 * | 5/2007 | Chan | 455/557 |
| 2007/0233957 A1 * | 10/2007 | Lev-Ran et al. | 711/118 |

(Continued)

*Primary Examiner* — Matt Kim
*Assistant Examiner* — Ryan Barrett
(74) *Attorney, Agent, or Firm* — Martine Penilla Group, LLP

(57) ABSTRACT

Methods and systems for controlling a networked display via a client device are provided. The client device and the networked display are connected by a network. A session is initiated between the client device and the networked display, and a remote user interface is transmitted from the networked display to the client device. Interactivity with the remote user interface is detected at the client device, and input data is transmitted from the client device to the networked display based on the interactivity with the remote user interface. The input data is interpreted at the networked display so as to cause a change in a state of an application being executed by the networked display. And the remote user interface is updated based on the changed state of the application executed by the networked display.

19 Claims, 7 Drawing Sheets

(56) References Cited

U.S. PATENT DOCUMENTS

| | | | |
|---|---|---|---|
| 2008/0228817 A1* | 9/2008 | Lee et al. .................... | 707/104.1 |
| 2009/0037393 A1* | 2/2009 | Fredricksen et al. ............. | 707/3 |
| 2009/0156251 A1* | 6/2009 | Cannistraro et al. .......... | 455/557 |
| 2009/0174653 A1* | 7/2009 | Shin et al. .................... | 345/156 |
| 2009/0239587 A1* | 9/2009 | Negron et al. ................. | 455/566 |
| 2009/0254839 A1* | 10/2009 | Kripalani et al. ............. | 715/753 |
| 2009/0262084 A1* | 10/2009 | Yu ................................ | 345/173 |
| 2009/0327910 A1* | 12/2009 | Black et al. .................... | 715/744 |
| 2010/0107018 A1* | 4/2010 | Benenson ....................... | 714/57 |
| 2010/0107128 A1* | 4/2010 | Thukral ........................ | 715/867 |
| 2010/0169790 A1* | 7/2010 | Vaughan et al. .............. | 715/740 |
| 2010/0241966 A1* | 9/2010 | Kim et al. ...................... | 715/740 |
| 2010/0313169 A1* | 12/2010 | Huang et al. .................. | 715/835 |
| 2011/0252318 A1* | 10/2011 | Helms ........................... | 715/702 |

* cited by examiner

Welcome to TV Widgets Remote!

Before being able to use this device with your TV you need to name and authorize it.

Go to the Profile Widget, then "System Settings", then "Pair a Device"

| Device Name: |
| Authorization Code: |

Continue

SYSTEM AND METHOD FOR CONTROLLING A NETWORKED DISPLAY

BACKGROUND

1. Field of the Invention

The present invention relates to methods and systems for providing remote control commands via HTTP requests.

2. Description of the Related Art

Televisions and displays are today utilized to render and enable users to interface with a variety of content. Televisions are often connected to various devices such as media players, set-top boxes, console systems, and the like, in order to enable rendering of various types of content. The types of content which may be rendered on a television or display may include broadcast video and audio, prerecorded video and audio, games, internet content, and various other types of content.

It is in this context that embodiments of the invention arise.

SUMMARY

Embodiments of the present invention provide methods and systems for presenting advertisements based on user interactivity with a web page. Several inventive embodiments of the present invention are described below.

In one embodiment, a method is provided for controlling a networked display via a client device, the client device and the networked display being connected by a network. According to the method, a session is initiated between the client device and the networked display, the session being defined by two-way communication between the client device and the networked display. A remote user interface is transmitted from the networked display to the client device. Interactivity with the remote user interface is detected at the client device. And input data is transmitted from the client device to the networked display based on the interactivity with the remote user interface. The input data is interpreted at the networked display so as to cause a change in a state of an application being executed by the networked display. And the remote user interface is updated based on the changed state of the application executed by the networked display.

In one embodiment, a method for controlling a networked display via a client device is provided, the client device and the networked display being connected by a network. According to the method, an application is executed on the networked display, the application having an associated remote control page. A two-way communication link is established between the networked display and the client device. The remote control page is transmitted from the networked display to the client device, and the remote control page is rendered on the client device. Interactivity with the rendered remote control page is detected at the client device, and input data is transmitted to the networked display based on the detected interactivity, so as to effect a change in a state of the executing application on the networked display.

In one embodiment, a system for enabling remote control of a networked display via a client device is provided. The system includes a networked display, the networked display configured to execute an application, the application having an associated remote control page. The system further includes a client device, the client device being connected to the networked display via a two-way communication link. The client device receives and renders the remote control page from the networked display, and the client device is further configured to detect interactivity with the rendered remote control page and transmit input data to the networked display based on the detected interactivity, so as to effect a change in a state of the executing application on the networked display.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

Figure 1:
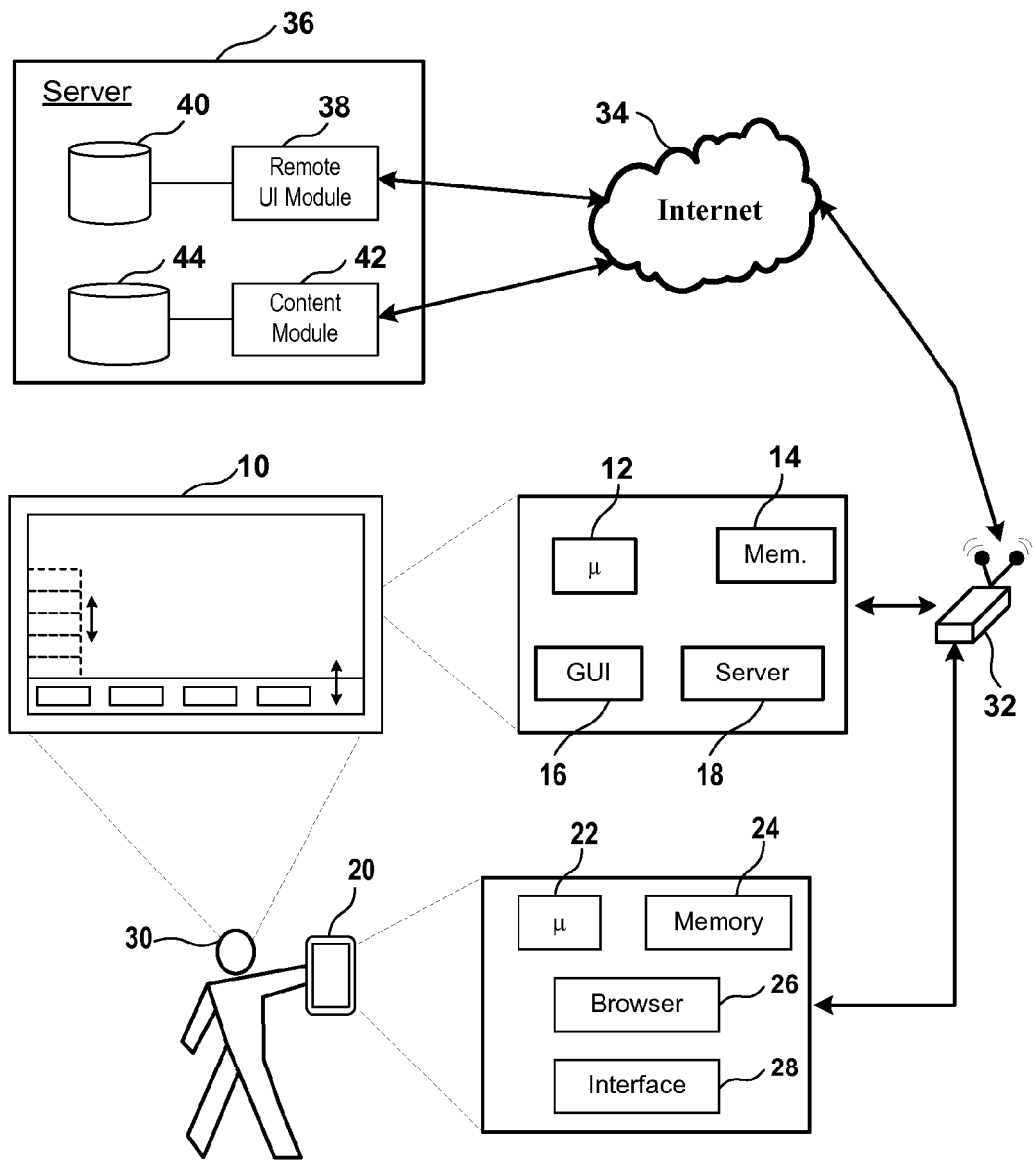
FIG. 1 a system for enabling a user to provide input to a networked display via a client device, in accordance with an embodiment of the invention.

A modern connected television (TV) or display is capable of connecting to a network such as the Internet to send and receive data. Such connectivity enables access to a rich diversity of content which is available over the Internet, beyond that which is available through normal television programming sources, such as cable and satellite television providers. Connected TVs may include various applications which are configured to execute on the television and make content available to a viewer using the television as an interface device. Examples of applications which may be executed on a connected television are described in U.S. provisional patent application No. 61/320,685, filed Apr. 2, 2010, entitled "METHODS AND SYSTEMS FOR DISPLAY DEVICE WIDGET ACCESS AND DEVICE MANAGEMENT," the disclosure of which is herein incorporated by reference in its entirety for all purposes.

However, while the rich content features which are available through connected TVs continues to grow, conventional remote control devices are not designed to assist the user in utilizing these new features of connected televisions. Thus, many remote control devices are ill-suited for enabling the user to navigate, provide input, and otherwise interact with applications on a connected television.

One solution to the above-described deficiencies of conventional remote control devices is to configure a portable device, such as a smartphone, personal digital assistant (PDA), tablet computer, or other type of handheld device, to be used as a remote control for the connected TV. Many such devices provide rich environments for development of applications to provide input data to a television. However, developing a native application for a specific portable device has several shortcomings.

First, the application must be written specifically for each device, which can be difficult and time-consuming. With limited resources it may only be possible to target some of the multitude of available devices. Additionally, native applications must also typically go through an approval process before they are allowed to be installed on the device. This introduces delays in the process of bringing an application to market, and also means that applications cannot be quickly and easily updated, as such updates must again go through the approval process. Furthermore, once approved, an application may be difficult to find amongst a plethora of other applications which are all featured in the same application repository (e.g. in an application store or other type of repository which makes the applications available for installation on the device).

In view of these difficulties, the following embodiments describe systems and methods for enabling control of a networked display via a client device. According to embodiments of the invention, a small web server is implemented by the networked display that redirects to device-specific HTML pages based on the type of client device. If no device-specific page is available, then a generic one is provided. By applying such an approach as described herein, immediate support is provided for all smartphones that have a built in browser. Furthermore it is possible to serve device-optimized HTML that targets a specific device, as requests are redirected in real-time based on the device's ID. Also, it is easier to update and deploy new functionality or add specific device support directly from external servers, and the open HTTP remote control protocol can be leveraged on other types of applications, such as other web pages, instant messaging applications, etc.

It will be obvious, however, to one skilled in the art, that the present invention may be practiced without some or all of these specific details. In other instances, well known process operations have not been described in detail in order not to unnecessarily obscure the present invention.

With reference to FIG. 1, a system for enabling a user to provide input to a connected or networked display via a client device is shown, in accordance with an embodiment of the invention. A networked display 10 may be any of various kinds of displays, such as a television, LCD, monitor, projector, or other kind of display which is capable of receiving and sending data over a network such as the Internet. The networked display 10 includes various components and functionality, including a processor 12 and memory 14 for executing applications, performing operations, storing data, etc. The networked display 10 includes a graphical user interface (GUI) 16 according to which a user may access various functions and settings of the display 10. Additionally, the networked display 10 operates a server 18, so as to enable a client device to be utilized to provide remote input, as is described in further detail below.

With continued reference to FIG. 1, a client device 20 is operated by a user 30. In various embodiments of the invention, the client device 20 may be any of various kinds of portable handheld devices, including a smartphone, personal digital assistant (pda), tablet computer, or any other type of portable handheld device which may be configured to provide remote control functionality in accordance with embodiments described herein. The client device 20 includes a processor 22 and memory 24 for executing program instructions, performing various operations, storing data, etc. The client device 20 also includes a browser 26 for accessing content via a network, such as an in-home local area network (LAN) or the Internet. The client device 20 also includes an interface 28, which is utilized by the user 30 to provide input to the client device 20. In various embodiments, the interface 28 may include any of various kinds of interface technologies, such as a touchscreen, joystick, trackpad, trackball, buttons, directional pad, keys, motion detection devices, etc.

As shown in the illustrated embodiment, the client device 20 and the networked display 10 are connected to a router 32, which in turn is connected to the Internet 34. It will be understood by those skilled in the art that this is merely one possible network configuration which enables network connectivity between the networked display 10 and the client device 20 and resources accessible via the Internet. It is contemplated that in other embodiments, any of various other types of network configurations and devices may be employed to enable communication between the networked display 10 and the client device 20 and Internet resources.

According to one embodiment of the invention, in order to utilize the client device 20 to provide input data to the networked display, the browser 26 is activated on the client device 20. The browser 26 may be an Internet browser application, or any other type of browser application which enables access to networked resources. Utilizing the browser 26, the user 30 enters or otherwise navigates to a URL of the server 18 of the networked display 10 (such as a hostname or IP address assigned to the server 18). In one embodiment, the URL or IP address may be stored as a bookmark so that the user 30 may easily navigate to it. The browser 26 may access the server 18 by executing HTTP requests utilizing the server's assigned URL. In response, the server 18 sends or redirects to a device-specific HTML page, which is received by the client device 20 and rendered by the browser 26. This device-specific HTML page provides a remote user interface for providing input to the networked display 10.

By way of example, the remote user interface may include various features such as selectable regions or buttons, which when selected, cause the client device 20 to send input data to the networked display 10. The input data may be utilized for various purposes related to the networked display 10, such as navigating within or indicating selection of items in menus displayed on the networked display 10, providing text input, maneuvering an object such as a pointer, navigating within an application, etc.

In one embodiment, the sending of input data may occur via HTTP protocol transmissions, such as HTTP GET requests, wherein information is passed in the headers. In this manner, various events such as keydown, keyup, or other keypress events can be communicated to the networked display 10. Information passed in the headers may include various kinds of information such as repeat intervals, counts, and parameters like acceleration and/or direction (with respect to detected gestures, as explained below).

With continued reference to FIG. 1, a server 36 is shown, the server 36 communicating with the networked display 10 via the network 34. In one embodiment, the aforementioned device-specific HTML page which provides the remote user interface is provided by a remote UI module 38 of the server 36 to the networked display 10. The remote UI module 38 retrieves various device-specific HTML pages from a remote UI storage 40. The device-specific HTML page may be downloaded from the server 36 to the networked display 10 in advance and stored on the networked display 10, so as to be easily locally retrieved by the server 18 of the networked display 10 when necessary. The device-specific HTML page may also be retrieved from the server 36 at the time the client device 20 initiates communications with the server 18 of the networked display 20 via the URL of the server 18. If no device-specific HTML page is available, then a generic HTML page may be provided.

In one embodiment, when a new client device type is identified by the server 18, then the appropriate device-specific HTML page or group of pages is retrieved from the remote UI module 38. These pages are then stored on the networked display 10 for future reference, so that when the same device type is encountered again, the appropriate device-specific HTML page may be retrieved locally at the networked display 10 and served more quickly to the client device 20. When another new device is detected, then appropriate device-specific HTML pages for that new device are retrieved from the remote UI module 38 at that time. Additionally, the server 18 may be configured to periodically check for updates to its stored device-specific HTML pages.

In one embodiment, the networked display 10 is configured to retrieve content from a content module 42 of the server 36. The content module 42 is in turn linked to a content storage 44, which stores content that may be served to the networked display 10. In various embodiments, the networked display may be configured to execute one or more applications which are configured to retrieve content from the content module 42. It will be understood by those skilled in the art that the networked display 10 may be configured to execute any kind of application that may be rendered and interfaced with via the networked display 10. Further examples of applications executed by the networked display 10 and methods for providing the same are disclosed in U.S. provisional patent application No. 61/320,685, filed Apr. 2, 2010, entitled "METHODS AND SYSTEMS FOR DISPLAY DEVICE WIDGET ACCESS AND DEVICE MANAGEMENT," the disclosure of which is incorporated herein by reference.

Figure 2:
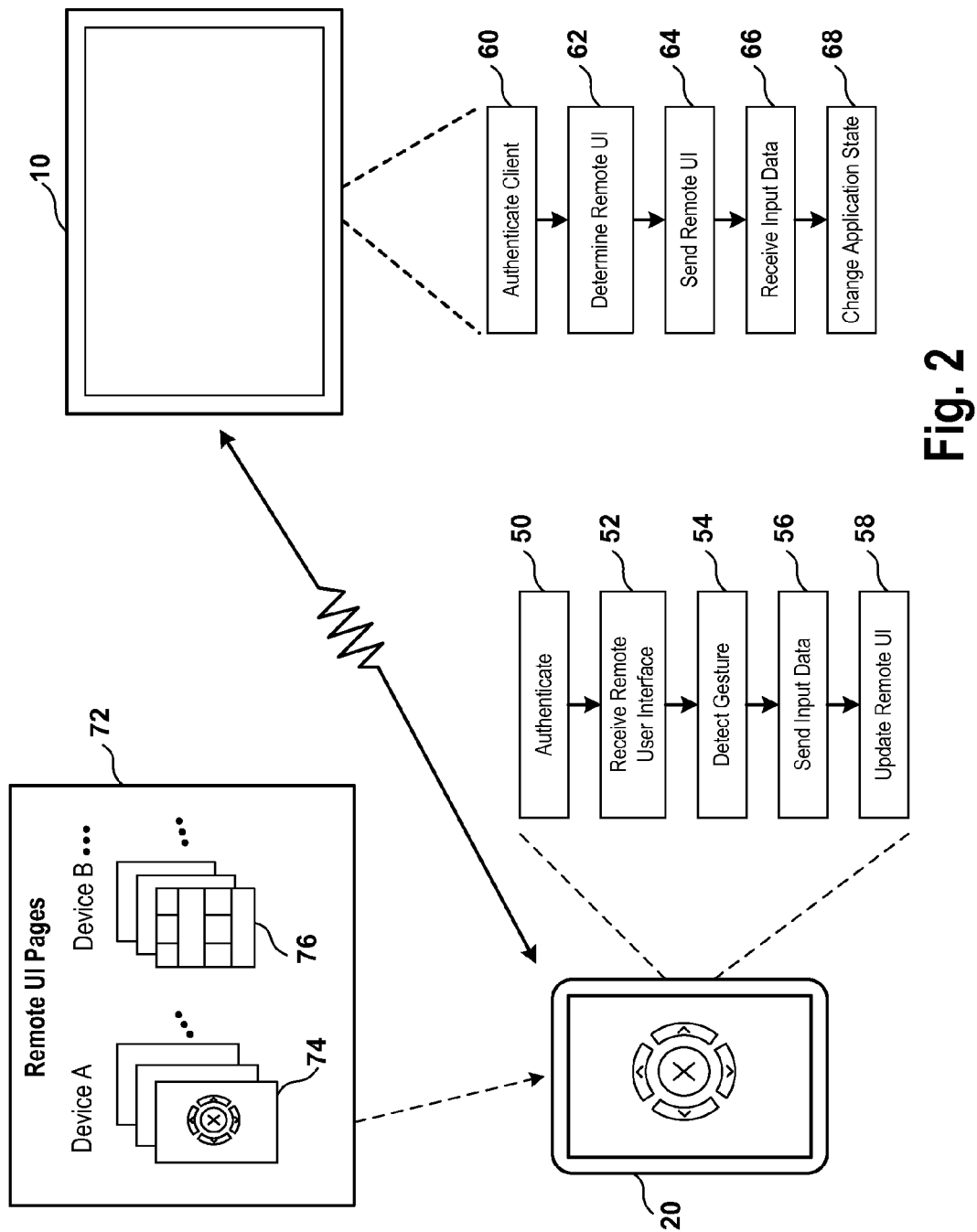
FIG. 2 illustrates various operations performed by a networked display and a client device, in accordance with an embodiment of the invention.

FIG. 2 illustrates various operations performed by a networked display 10 and a client device 20, in accordance with an embodiment of the invention. At operation 50, the client device 20 initiates an authentication procedure with the networked display 10. The authentication may be initiated by, for example, navigating to a URL of the networked display 10. At corresponding operation 60, the networked display 10 authenticates the client device 20 for use as a remote device for providing input data to the networked display 10. The authentication procedure may involve the submission and verification of identification data such as a predetermined password, hardware identification data, or other types of identification data which are useful for verifying the identification of the client device 20. The authentication procedure may also establish secure communication between the client device 20 and the networked display 10 according to any of various secure protocols.

In one embodiment, the authentication procedure defines the initiation of a session between the client device 20 and the networked display 10. The session may be defined by two-way communication between the client device 20 and the networked display 10. In one embodiment, a timer may be executed at the networked display 10, the timer being configured to trigger termination of the session when a predetermined amount of time has elapsed without any activity.

In another embodiment, the networked display 10 and client device 20 may be configured to automatically establish a connection when the client device 20 is detected in the vicinity of the networked display 10. In one embodiment, the proximity of the client device 20 might be detected based on connection of the client device 20 the same local network as the networked display 10. In other embodiments, other methods for establishing proximity of the client device 20 to the networked display 10 may be utilized.

At operation 62, the networked display 10 determines the device type of the client device 20, and determines an appropriate remote user interface for that device type. The remote user interfaces for different types of devices may vary based on factors such as screen size and resolution, available interface technologies (such as touchscreen, buttons, trackball, touchpad, joystick, etc.), and other variances in features and properties of different types of devices. A remote user interface may include any of various features which are useful for enabling the user to provide commands and input to the networked display 10. For example, the remote user interface may include a number of buttons or other features for navigation, selection, or other specialized functions which are useful for interfacing with content displayed on the networked display 10.

As used herein, content displayed on the networked display 10 shall be broadly construed to include any of various items which may be rendered on the networked display 10, including, but not limited to, video, images, menus, adjustment parameters, settings, applications, or any other kind of content which may be displayed on the networked display 10. Various exemplary remote user interfaces are described further below.

At operation 64, the networked display 10 sends the appropriate remote user interface to the client device 20, which receives and renders the remote user interface at operation 52 by displaying it on the client device 20. At operation 54, the client device 20 detects gesture input or other types of input which indicate the user's interaction with the remote user interface displayed on the client device 20. Gesture input will be understood by those skilled in the art to include any of various kinds of detected actions on a touch-sensitive device (such as a touchscreen), including, but not limited to, the following actions: tapping or touching the touch-sensitive device with one or more fingers, touching and moving (or swiping) one or more fingers across the touch-sensitive device, tracing a path on the touch-sensitive device such as that of a shape, symbol, letter, number, or other element which may or may not be displayed as part of the remote user interface, etc.

Thus, by way of example, in one embodiment, detection of gestures may include detection of the user touching or tapping buttons of the displayed remote user interface. In response to detection of the selected button, the remote user interface is configured to send input data (operation 56) from the client device 20 to the networked display 10, the input data being indicative of the selected button of the remote user interface. Selection of a button of the remote user interface is merely one example of an event according to which input data is sent to the networked display 10. It will be apparent to those skilled in the art that in various embodiments, any type of interactive event with the remote user interface which may be detected on the client device 20 may be configured to trigger sending of input data (operation 56) to the networked display 10.

At operation 66, the networked display 10 receives the input data from the client device 20. The input data is then processed to effect the performance of a function on the networked display 10. For example, in one embodiment, the input data may indicate commands for navigation or selection within a menu or application rendered on the networked display 10. In other embodiments, the input data may indicate other types of input relevant to content rendered on the networked display, such as text or numerical input, directional input, symbolic input, etc.

In some embodiments, wherein an application is being executed by the networked display 10, the received input may be processed so as to cause a change in the state of the application (operation 68). The changed state of the application may be reflected in the rendering of the application on the networked display 10.

In some embodiments, the remote user interface may be updated (operation 58). The updating of the interface is configured to provide an appropriate user interface to the user for the content which is displayed on the networked display 10. For example, in one embodiment, a user may be presented with an interface which enables directional navigation and selection. A user might use such an interface to navigate to a certain item and select the item. However, following selection of the item, the user may be required to enter text input. The remote user interface may thus be updated so as to provide the user with an interface which enables text input, such as, for example, a keyboard and/or number pad layout on the touchscreen display of the client device 20.

A text entry box might also be provided as part of the remote user interface so that the user may see text on the client device 20 as it is being entered without having to look at the display in order to verify that text is being entered correctly. Or in another embodiment, the remote user interface may be updated such that a region is provided on the client device for the user may draw letters, numbers, symbols, or other gestures which are detected via the touchscreen of the client device 20.

By enabling updating of the remote user interface which is provided on the client device 20, embodiments of the invention provide for a dynamic interface which may be changed and adapted so as to provide appropriate interface mechanisms which facilitate ease of operation with regard to the current status of content displayed on the networked display. These interface mechanisms may vary extensively depending upon the nature of the content or application shown on the networked display 10 for which the interface is intended to be utilized. Embodiments of the invention contemplate that any of various types of interfaces may be provided sequentially via updates of the remote user interface. The particular interface which is provided to the client device 20 at any given time is determined based on the current status of the content or application which is displayed on the networked display 10. Accordingly, it is possible to have any of various sequences of interfaces provided to the client device 20 depending upon the state of the content or application displayed on the networked display 10, which may be affected by the user's input (provided by way of one of the interfaces).

Additionally, it will be noted by those skilled in the art that in some embodiments of the invention, the updates provided to the remote user interface may be in total, such that an update presents an entirely new interface to the user. Examples include switching between various types of interfaces, such as a navigational interface, a text entry interface, a trackpad-type interface, etc.

In other embodiments, the updates provided to the remote user interface may be partial, wherein one or more portions of the remote user interface are updated. For example, a region of an interface might be designated to display certain information which can be updated. Or a button or other selectable icon might be updated to indicate a change in status (e.g. on or off status). The button or icon could be changed in appearance, such as by changing colors, highlighting, or replacement with a different icon. Selected buttons or icons might be called to the attention of the user by highlighting them in some fashion, such as by causing them to flash or be displayed more prominently than others based on color, shading, relative brightness, font size/type, etc. This could aid the user in determining which buttons of an interface are especially appropriate for providing input or otherwise interacting with content or an application shown on the networked display 10.

The specific examples of partial updating of the remote user interface as described herein are provided by way of example only and not by way of limitation. It will be appreciated by those skilled in the art that in other embodiments of the invention, any of various types of partial updates to the remote user interface may be provided so as to provide the user with an interface which is relevant to content or an application displayed on the networked display 10.

With continued reference to FIG. 2, remote user interface pages 72 are supplied to the client device as needed. The remote user interface pages 72 may be stored locally at the networked display 10 or on a locally attached storage device, or they may be stored remotely and made accessible via network. The remote user interface pages 72 include specific pages which are tailored to suit particular client device types. As shown, certain user interface pages 74 are suitable for a device type A, whereas certain user interface pages 76 are suitable for a device type B. In the illustrated embodiment, the client device 20 is of device type A, and therefore remote user interface pages are supplied from the corresponding user interface pages 74 which are appropriate for device type A With reference to FIG. 3A, a diagram illustrating a procedure for pairing a client device 20 with a networked display 10 is shown, in accordance with an embodiment of the invention. As shown, the client device 20 and networked display 10 are connected via a network 80. Additionally, a content server 82 is also accessible via the network 80. The content server is in turn linked to remote interface pages 84.

In order to use the client device 20 for providing remote user interfaces for interfacing with the networked display 10, the client device 20 is first paired with the networked display 10. As the client device 20 cannot yet be used as a functional remote interface prior to pairing, the user may utilize a standard remote control 86 for providing input to the networked display 10. As shown, the user navigates to a settings menu so as to enable pairing of a client device. A particular authentication code is provided to the user.

As shown at reference numeral 88, the user utilizes a browser application on the client device 20 to navigate to a URL or IP address of the networked display 10. In response, the networked display serves a pairing input page at operation 98. The pairing input page is displayed on the client device 20 (reference numeral 90) for the user to provide the proper authentication code. Upon entry of the proper authentication code, the client device 20 is authenticated (operation 92) and a remote interface page is received from the networked display 10 (operation 94). The remote interface page is displayed on the client device 20 (reference numeral 96). Correspondingly at the networked display 10, at operation 100, the entered authentication code is confirmed, and at operation 102 a device-specific remote interface page which is appropriate for the device type of the client device 20 is retrieved and sent to the client device 20. The device-specific remote interface page may be retrieved from the remote interface pages 84 if it is not already locally stored at the networked display 10.

After the client device 20 has been paired with the networked display 10, the next time the user utilizes the browser on the client device 20 to navigate to the URL or IP address of the networked display 10, the networked display 10 authenticates the client device (operation 104) and serves a remote interface page to the client device 20.

Figure 3A:
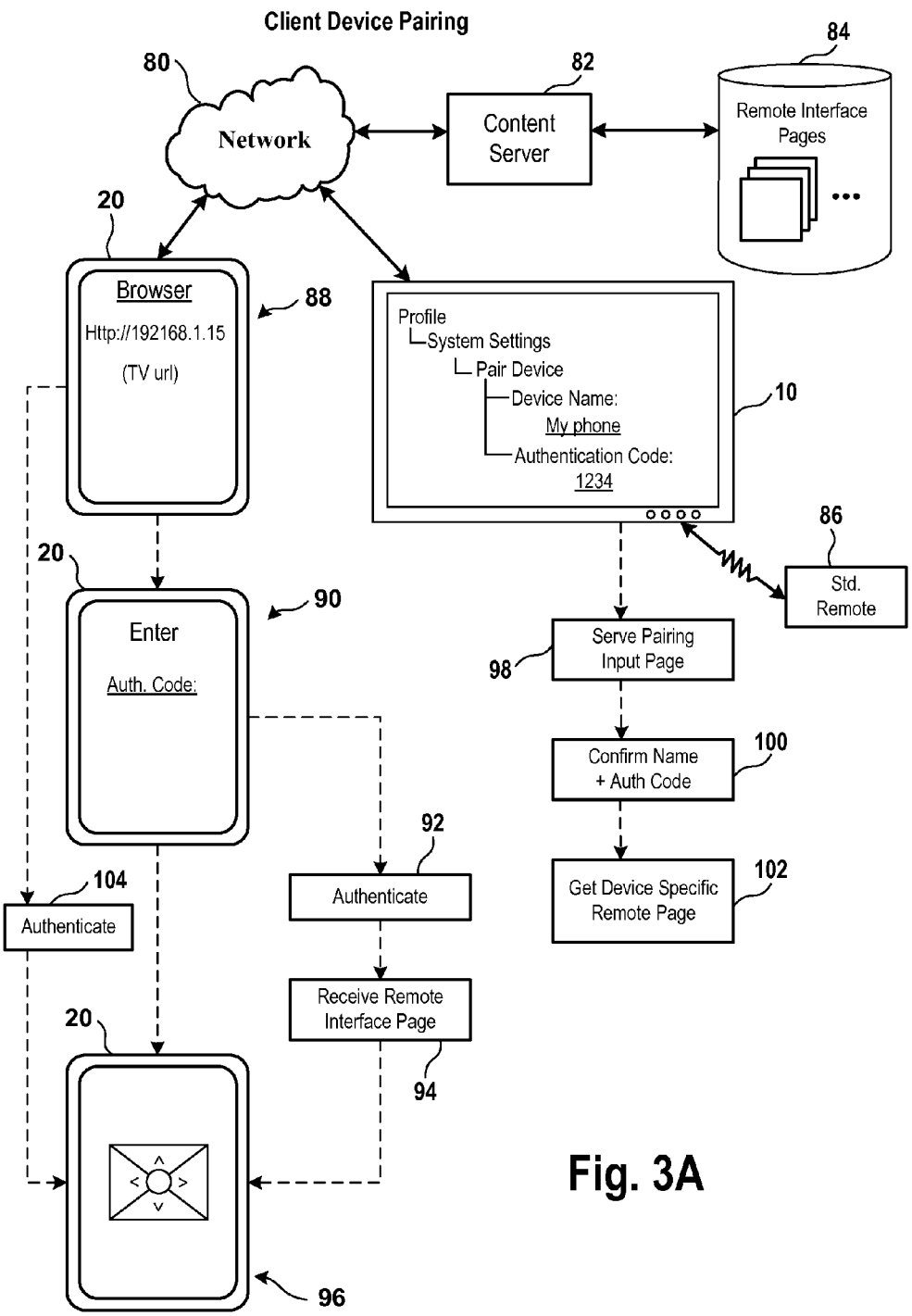
FIG. 3A illustrates a diagram showing a procedure for pairing a client device with a networked display, in accordance with an embodiment of the invention.
Figure 3B:
FIG. 3B illustrates an exemplary pairing input page, in accordance with an embodiment of the invention.

With reference to FIG. 3B, an exemplary pairing input page is shown, as described with reference to operation 98 of FIG. 3A, in accordance with an embodiment of the invention.

When the user operates the client device 20 and navigates to the URL or IP address of the networked display 10 and the client device 20 is not recognized by the networked display 10, then a pairing input page such as that shown at FIG. 3B is sent to the client device and rendered to the user. As shown, the user is requested to enter a name for the client device, as well as an authentication code. In one embodiment, the authentication code is provided when the user operates the networked display (e.g. utilizing a conventional remote control) so as to navigate to a "Pair a Device" section within the "System Settings" of a Profile Widget, which is an application on the networked display 10. After the user provides a unique name and the proper authentication code, then the client device 20 is authenticated for use with the networked display 10.

Figure 4:
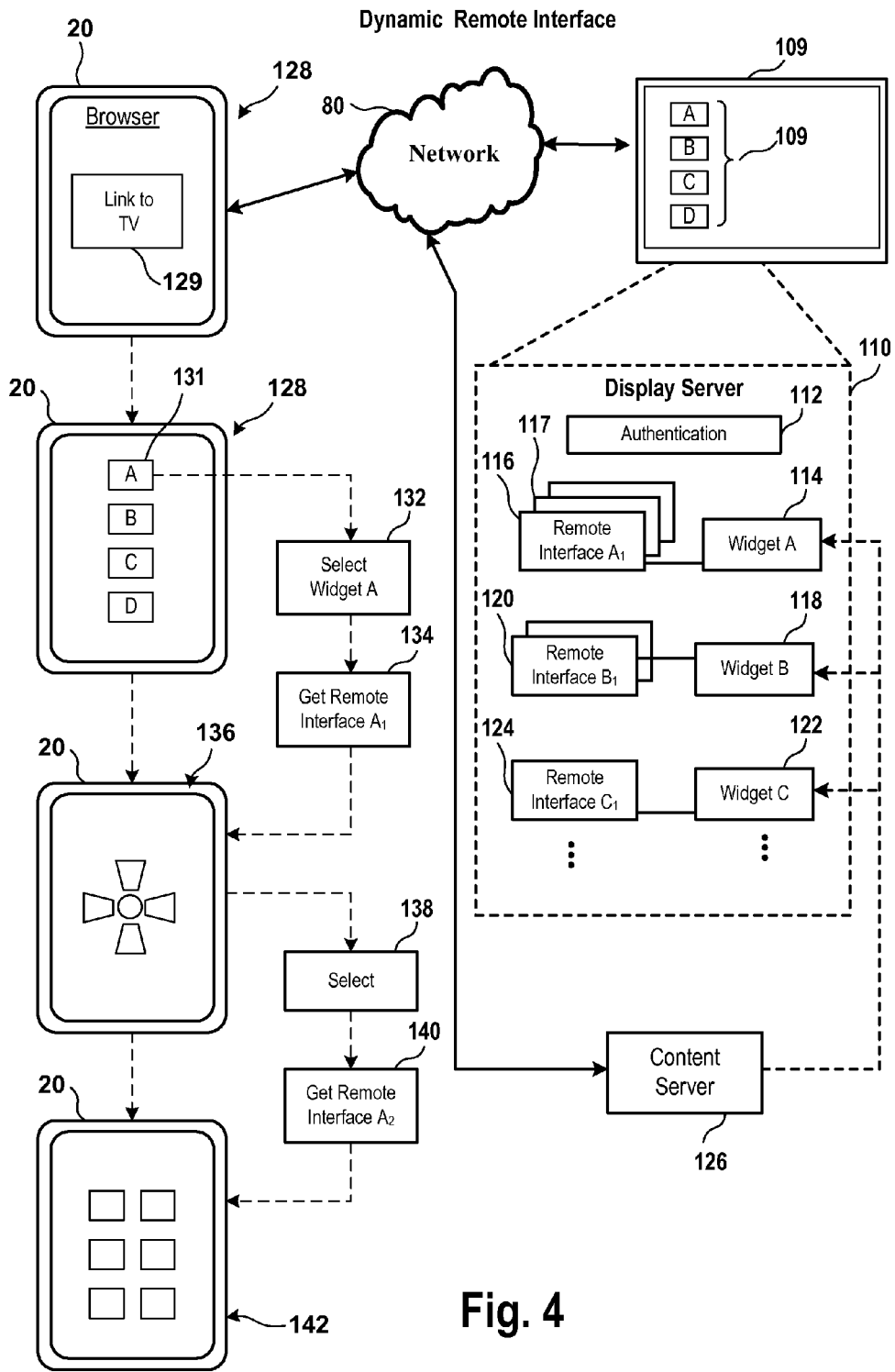
FIG. 4 illustrates a diagram showing an example of a dynamic remote user interface as applied to an application running on a networked display, in accordance with an embodiment of the invention.

With reference to FIG. 4, a diagram illustrating an example of a dynamic remote user interface as applied to an application running on a networked display is shown, in accordance with an embodiment of the invention. As shown in the illustrated embodiment, a client device 20 connects to the networked display 10 via a network 80. Additionally, a content server 126 is accessible via the network 80. The networked display 110 includes a display server 110, which executes a number of modules and/or applications. It will be understood that the display server 110 is embodied on system resources included in the networked display 10, such as one or more processors and one or more types of memory (not shown).

As shown by reference 128, a user may utilize a browser or other application of the client device 20 to navigate to a URL or IP address of the display server 110 of the networked display 10. In one embodiment, in order to streamline the procedure for connecting to the display server 110, the navigation to the display server's URL or IP address may be accomplished by utilizing a shortcut or bookmark or other simplified interface, such as button 129 as shown on the client device 20. Upon receiving a request from the client device 20, the display server 110 operates an authentication module 112 which performs an authentication procedure to verify that the client device 20 has been approved for use with the display server 110.

The authentication module 112 may utilize any of various kinds of authentication technologies in order to determine if the client device 20 has been approved for use with the display server 110. These may involve the use of various kinds of information, such as addresses or codes associated with specific hardware of the client device 20, such as a MAC address, predetermined authorization codes, user ID, etc. The authentication module 112 may also establish secure communication between the client device 20 and the display server 110 via any of various secure communication protocols, such as, for example, those utilizing public/private key encryption.

In the illustrated embodiment, the display server 110 includes a number of widgets, which are applications executed by the networked display 10. As shown, the display server 110 includes a widget A 114, a widget B 118, and a widget C 122. Each of the widgets may have one or more remote interface pages associated with it. These associated remote interface pages provide a remote user interface to the user when rendered on the client device 20 which is specifically tailored to the widget for which they are associated. Thus, they enable the user to interface with and provide input to the widgets via an interface which is better adapted for the specific widget which is being executed and rendered on the networked display 10 at that given time. In the illustrated embodiment, the widget A 114 has an associated remote interface A1 116, widget B 118 has an associated remote interface B1 120, and widget C 122 has an associated remote interface C1 124.

With continued reference to FIG. 4, when the client device 20 has been authenticated and established as a device which may be used with the display server 110, the display server 110 provides a remote interface page to the client device 20, as shown at reference 130. In the illustrated embodiment, the networked display 10 is shown displaying a menu of widgets 109, including corresponding icons for the aforementioned widget A 114, widget B 118, and widget C 122. Accordingly, the client device 20 is provided with a remote interface page which includes corresponding selectable icons for the widgets, as shown at reference 130.

By way of example, at operation 132, a user selects the selectable icon 131 which corresponds to widget A 114. This causes input data indicating selection of widget A 114 to be sent from the client device 20 to the display server 110. The display server 110 therefore activates widget A 114, rendering it on the networked display 10. At operation 134, the remote interface A1 116 is sent from the display server 110 to the client device 130. The remote interface A1 116 is thus rendered on the client device 20, as shown at reference 136, thereby providing the user with an interface which is specifically tailored for operation with widget A 114.

Continuing by way of example, at operation 138, the user may indicate selection of an item or some other action while operating widget A. This causes operation 140, wherein remote interface A2 117 is sent from the display server 110 to the client device 20. The client device 20 renders the remote interface A2, as shown at reference 142.

It will be appreciated by those skilled in the art that the foregoing description is provided as merely an example in which an interface provided to the user changes dynamically depending upon the widget being operated and the user's input and interaction with the widget. The user is not required to utilize the same interface for each widget, as would be the case with a conventional remote control device, but can experience a different interface customized for each of the widgets, and even different interfaces while interacting with one particular widget. In other embodiments of the invention, any particular sequence of operations related to the initiation and operation of widgets or other applications, or any other type of content which may be displayed on the networked display 10, may be configured so as to provide a dynamically changing remote user interface utilizing the principles described herein.

Figure 5:
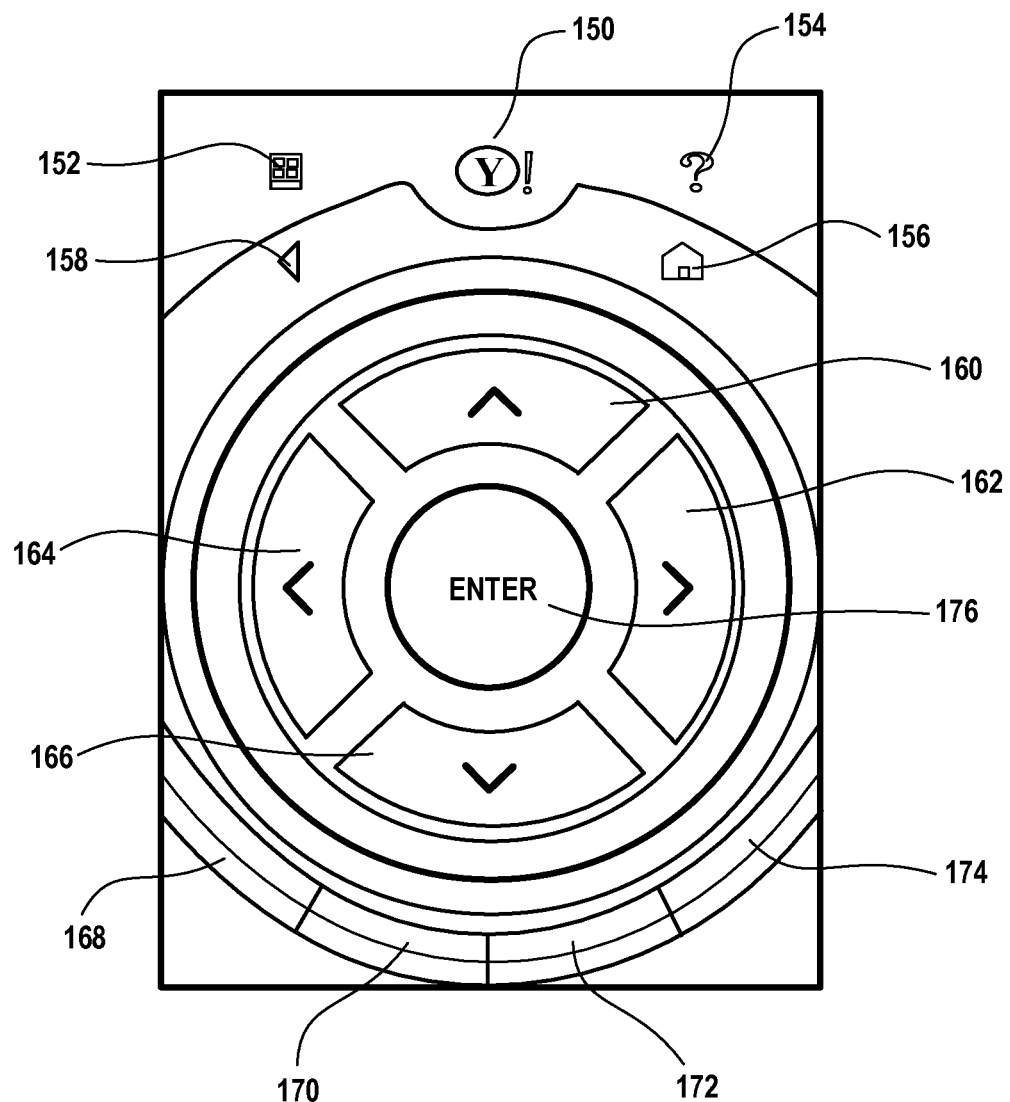
FIG. 5 illustrates an exemplary remote user interface, in accordance with an embodiment of the invention.

With reference to FIG. 5, an exemplary remote user interface is shown, in accordance with an embodiment of the invention. The remote user interface in the illustrated embodiment is intended to be rendered on a touchscreen display of a client device, and includes various selectable icons, or buttons. A dedicated property button 150 provides easy access to a particular property or content destination, such as a particular webpage or a particular widget or application. For example, in one embodiment, the dedicated property button 150 is configured so that pressing it causes the networked display to launch a web browser and navigate to a predetermined web page, such as the Yahoo! home page. Or in another embodiment, pressing the dedicated property button 150 may cause an specific application or widget to launch on the networked display, such as a Yahoo! application which provides access to Yahoo! content.

A keyboard button 152 provides access to a keyboard interface so as to enable the user to enter text input. An information button 154 provides access to help information or other information which may be related to particular content displayed on the networked display. A back button 158 returns a user to a previous destination, such as a previous web page to one currently being viewed, or a previous point within a menu tree, or some other previous navigational destination within an application, a menu, or some other content shown on the networked display. A home button 156 provides instant access to a home menu or home destination from which the user may access various options available on the networked display.

Navigational buttons 160, 162, 164, and 166 enable the user to navigate within menus or other types of content. In some embodiments, the navigational buttons may also be configured to perform specific functions in particular contexts, such as controlling a level of an adjustable attribute such as volume or various audio or video display properties, changing channels, adjusting playback within video content such as fast-forwarding or rewinding, etc. A selection button 176 enables a user to indicate selection of an item such as a menu item or some other selectable item shown on the networked display. The selection button 176 could also be configured to perform other functions depending upon the context, such as initiating playback or pausing of video content.

Auxiliary buttons 168, 170, 172, and 174 may be configured to provide additional functionality. For example, in one embodiment, the auxiliary buttons 168, 170, 172, and 174 may be user-assignable, so as to enable the user to configure them as shortcuts to favorite applications or other types of content accessible via the networked display. In other embodiments, the auxiliary buttons 168, 170, 172, and 174 may have different functions based on the context of content displayed on the networked display. For example, an application or other content may be configured to display selection choices which correspond to the auxiliary buttons 168, 170, 172, and 174.

In one embodiment, the auxiliary buttons 168, 170, 172, and 174 may have different colors, shadings, shapes or other unique identifying characteristics. An application or other content configured to display selection choices corresponding to the auxiliary buttons 168, 170, 172, and 174 may be configured to display the same colors, shadings, shapes or other unique identifying characteristics on the networked display so as to communicate to the user that pressing the auxiliary buttons 168, 170, 172, or 174 will perform a particular function.

Figure 6:
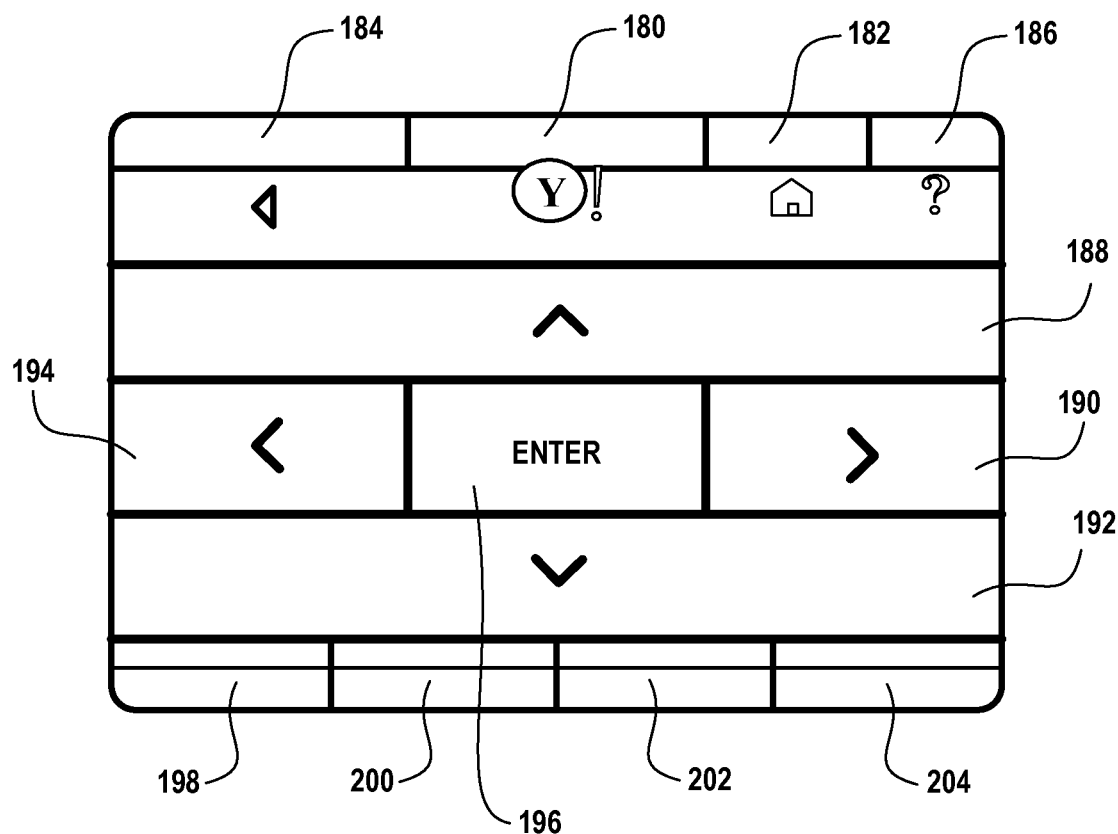
FIG. 6 illustrates a remote user interface page, in accordance with an embodiment of the invention.

With reference to FIG. 6, a remote user interface page is shown, in accordance with an embodiment of the invention. A dedicated property button 180 provides easy access to a particular property or content destination, such as a particular webpage or a particular widget or application. A home button 182 provides instant access to a home menu or home destination from which the user may access various options available on the networked display. A back button 184 returns a user to a previous destination, such as a previous web page to one currently being viewed, or a previous point within a menu tree, or some other previous navigational destination within an application, a menu, or some other content shown on the networked display.

Navigational buttons 188, 190, 192, and 194 enable the user to navigate within menus or other types of content. In some embodiments, the navigational buttons may also be configured to perform specific functions in particular contexts, as discussed above. A selection button 196 enables a user to indicate selection of an item such as a menu item or some other selectable item shown on the networked display. The selection button 176 could also be configured to perform other functions depending upon the context.

Auxiliary buttons 198, 200, 202, and 204 may be configured to provide additional functionality. For example, the auxiliary buttons 198, 200, 202, and 204 may be user-assignable, or they may have different functions based on the context of content displayed on the networked display. By way of example, an application or other content may be configured to display selection choices which correspond to the auxiliary buttons 198, 200, 202, and 204. In one embodiment, the auxiliary buttons 198, 200, 202, and 204 may have different colors, shadings, shapes or other unique identifying characteristics.

The illustrated embodiment of FIG. 6 differs from that of FIG. 5 in terms of design and layout, and may be designed to suit the touchscreen display of a different client device than that of FIG. 5. The foregoing examples of remote interface pages have been provided by way of example only, and not by way of limitation. In other embodiments, device-specific remote user interface pages may have any design suitable for any client device which may be utilized to render and enable use of remote interface pages in accordance with embodiments of the invention described herein.

The determination of the appropriate remote user interface for the client device may be based on the device type of the client device as well as other factors. Various possible remote user interfaces applicable to certain exemplary contexts have been discussed herein. However, it will be understood by those skilled in the art that in other embodiments of the invention, other remote user interfaces may be provided for similar or other types of contexts. In other embodiments, the appropriate remote user interface for the specific device type may be based on not only the specific device, but also the type of content being actively rendered on the networked display. For example, the content may be a menu, application, video content, photo content, internet content, text, graphics, audio content, etc.

For example, in one embodiment, the remote user interface includes various buttons applicable to television viewing, such as channel up/down buttons, numerical keys, display settings, volume controls, or any other types of buttons which may be applicable to television viewing. In another embodiment, the user interface is adapted for use with one or more applications which are executed by or otherwise rendered by the networked display. For example, the remote user interface may include a home button for navigating to a home interface, which may, for example, include a menu of available applications on the networked display. The remote user interface may also include various other types of navigational and other input features for enabling interaction and submission of input for applications on the networked display.

While foregoing embodiments of the remote user interface have generally been described with reference to various types of buttons, it will be appreciated by those skilled in the art that in other embodiments any of various other kinds of features may be included in a remote user interface. For example, the remote user interface may include a movable slider, a rotatable feature, or otherwise apparently movable feature for enabling adjustment of a parameter in an intuitive manner. It is to be understood that movement of a feature occurs via animation of the feature so as to convey a sense of movement to the user, as the remote user interface is rendered on a display of the client device, in response to the user's interaction with the feature, such as via gestures detected on a touchscreen display of the client device. However, movement of the feature by the user also causes input data to be communicated from the client device to the networked display indicative of the movement of the feature by the user.

In other embodiments wherein a touchscreen display of the client device is utilized, the remote user interface may be configured to detect and respond to certain types of gestures on the touchscreen display. For example, the user might trace a symbol or letter indicative of a particular desired action. For example, tracing the letter "P" could indicate play, tracing the letter "S" could indicate stop, etc. with respect to playback of content on the networked display. Tracing particular letters or symbols in other contexts could provide other types of functionality, such as with particular applications or widgets rendered on the networked display.

In another example, swiping in a particular direction could affect playback, such as swiping to the right causing fast-forward of content playback, whereas swiping to the left may cause rewind of content playback. Multiple sequential swipes in a particular direction may indicate increasing speed of fast-forward or rewind. Similarly, swiping in particular directions such as up or down, and left or right, could be utilized for changing channels, affecting volume, or adjusting some other parameter related to the rendering of content on the networked display.

In still other embodiments, detection of gestures may be related to particular features rendered on the touchscreen display of the client device. For example, the user may be required to execute gestures over a particular feature or region of the remote user interface so as to cause an action associated with the gesture. The foregoing examples of gestures and their interpretation and utilization are provided by way of example only, and not by way of limitation. In various other embodiments of the invention, it will be appreciated that any of various other kinds of gestures may be detected and interpreted for use with a remote user interface as defined herein.

As demonstrated by the foregoing, embodiments of the invention provide for methods and systems to enable use of a remote interface page which has been transmitted from a networked display to a client device. By enabling a remote interface page to be rendered on the client device via a browser on the client device, no separate application is required to be installed on the client device. This means that costly application approval procedures are avoided, and that updates to the remote interface page may be provided in a timely fashion without going through such application approval processes.

Embodiments of the invention as herein described may utilize relational database systems as are known in the art. Examples of such database systems include MySQL, Oracle, and Access. Various operations as described above may be effected by performance of an operation via a relational database management system. Such database systems may be embodied in one or more server computers, which may be configured as part of a network of computers.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data may be processed by other computers on the network, e.g. a cloud of computing resources.

The embodiments of the present invention can also be defined as a machine that transforms data from one state to another state. The data may represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

The invention can also be embodied as computer readable code on a computer readable medium. The computer readable medium may be any data storage device that can store data, which can thereafter be read by a computer system. Examples of the computer readable medium include hard drives, network attached storage (NAS), read-only memory, random-access memory, FLASH based memory, CD-ROMs, CD-Rs, CD-RWs, DVDs, magnetic tapes, and other optical and non-optical data storage devices. The computer readable medium can also be distributed over a network coupled computer systems so that the computer readable code may be stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for controlling a networked display via a client device, the client device and the networked display being connected by a network, the method comprising:

rendering broadcast content on the networked display, the networked display being a television;

executing an application on the networked display, the application configured to render application content that is additional to and coordinated to the broadcast content that is being rendered on the networked display;

initiating an HTTP session between the client device and a local server, the local server being integrated as a part of the networked display, the session defined by two-way communication between the client device and the local server;

identifying, by the local server, a type of the client device;

determining, by the local server, whether a user interface that is configured for execution of the application and for the identified type of the client device is stored to a local storage of the networked display, and if so, then retrieving the user interface from the local storage, and if not, then downloading the user interface from a remote server to the local server, the user interface being defined by at least one device-specific HTML page;

transmitting the user interface from the local server to the client device for rendering at the client device;

receiving, by the local server, input data from the client device based on detected interactivity with the rendered user interface; and interpreting the input data at the networked display so as to cause a change in a state of the application being executed by the networked display.

2. The method of claim 1, wherein initiating the session includes accessing an address or resource locator assigned to the networked display; wherein the accessing of the address or resource locator occurs via a browser application installed on the client device.

3. The method of claim 1, wherein the user interface includes selectable items, the selectable items being configured to cause transmission of the input data to the networked display when selected.

4. The method of claim 3, wherein the selectable items include one or more of a navigational button, selection indicator, menu access, value adjustment, number, letter.

5. The method of claim 1, wherein the interactive input includes gesture interactivity detected on a touchscreen of the client device, the gesture interactivity including one or more of touching the touchscreen, swiping a finger across the touchscreen, tracing a predefined path on the touchscreen, drawing a letter, number, or symbol on the touchscreen.

6. The method of claim 1, wherein the user interface is selected based on content being actively displayed on the networked display.

7. The method of claim 1, further comprising updating the user interface based on the changed state of the application executed by the networked display, wherein updating the user interface produces a change in a portion of the user interface.

8. The method of claim 1, further comprising updating the user interface based on the changed state of the application executed by the networked display, wherein updating the user interface produces a change in the entirety of the user interface.

9. The method of claim 1, further comprising:
transmitting an application selection interface from the networked display to the client device, the application selection interface configured to provide access to a plurality of applications configured for execution on the networked display; and
in response to receiving a selection via the application selection interface at the client device, launching the application on the networked display.

10. The method of claim 1, wherein the networked display is a television, and wherein the user interface is configured to provide control of one or more of channel selection or volume.

11. A method for controlling a networked display via a client device, the client device and the networked display being connected by a network, the method comprising:
establishing a two-way communication link between the networked display and the client device, the networked display being configured to render broadcast content;
identifying, by the networked display, a type of the client device;
determining, by the networked display, whether an application selection page that is configured for the identified type of the client device is stored to a local storage of the networked display, and if so, then retrieving the application selection page from the local storage, and if not, then downloading the application selection page from a remote server to the networked display, the application selection page being defined by at least one device-specific HTML page;
transmitting an application selection page from the networked display to the client device for rendering on the client device, the application selection page configured to provide access to a plurality of applications configured for execution on the networked display;
in response to receiving a selection via the rendered application selection page at the client device, executing and rendering an application on the networked display, the executing application configured to render application content that is additional to and coordinated to the broadcast content, the application having an associated control page;
transmitting the control page from the networked display to the client device for rendering on the client device, the control page being selected based on the identified type of the client device; and
receiving input data at the networked display based on detected interactivity with the rendered control page, so as to effect a change in a state of the executing application on the networked display.

12. The method of claim 11, wherein the application has multiple associated control pages; and
wherein the control page transmitted to the client device is selected from the multiple associated control pages based on the state of the executing application.

13. The method of claim 11, wherein the establishing the two-way communication link, the rendering of the control page, the detecting interactivity, and the transmitting input data are performed via a browser executing on the client device.

14. The method of claim 13, wherein the browser is a general purpose application which has not been specifically designed to facilitate rendering of the control page.

15. A system for enabling remote control of a networked display via a client device, the system comprising:
a networked display, the networked display being a television configured to render broadcast content, the networked display configured to execute an application, the application configured to render application content that is additional to and coordinated to the broadcast content, the application having an associated control page;
a client device, the client device being connected to the networked display via a two-way communication link, the client device receiving and rendering the control page from the networked display, the client device further configured to detect interactivity with the rendered control page and transmit input data to the networked display based on the detected interactivity, so as to effect a change in a state of the executing application on the networked display;

wherein the networked display is configured to identify a type of the client device and determine whether the control page is stored to a local storage of the networked display, and if so, then retrieve the control page from the local storage, and if not, then download the control page from a remote server to the networked display; and wherein the control page is updated based on the changed state of the application executed by the networked display, wherein updating the control page produces a change in a portion of the control page.

16. The system of claim 15, wherein the application has multiple associated control pages; and wherein the control page transmitted to the client device is selected from the multiple associated control pages based on the state of the executing application.

17. The system of claim 15, wherein the client device includes a browser, the browser being utilized to establish the two-way communication link, receive and render the control page, detect interactivity, and transmit the input data.

18. The system of claim 17, wherein the browser is a general purpose application which has not been specifically designed to facilitate rendering of the control page.

19. The system of claim 15, wherein the networked display is configured to transmit an application selection interface from the networked display to the client device, the application selection interface configured to provide access to a plurality of applications configured for execution on the networked display;

wherein receipt of a selection via the application selection interface at the client device triggers launching of the application on the networked display.

* * * * *